(12) United States Patent
Skinner et al.

(10) Patent No.: US 8,570,601 B2
(45) Date of Patent: Oct. 29, 2013

(54) PROCESS DIRECTION STREAK SOURCE DIAGNOSIS IN PRINTERS

(75) Inventors: Gary W. Skinner, Rochester, NY (US); Aaron M. Burry, Ontario, NY (US); Vladimir Kozitsky, Rochester, NY (US); Eric S. Hamby, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 208 days.

(21) Appl. No.: 13/097,631

(22) Filed: Apr. 29, 2011

(65) Prior Publication Data
US 2012/0274997 A1    Nov. 1, 2012

(51) Int. Cl.
| | |
|---|---|
| G06K 15/22 | (2006.01) |
| G06K 15/00 | (2006.01) |
| G06K 9/00 | (2006.01) |
| G06K 9/40 | (2006.01) |
| G06K 9/36 | (2006.01) |
| H04N 1/00 | (2006.01) |
| H04N 1/60 | (2006.01) |

(52) U.S. Cl.
USPC ............... 358/2.1; 358/1.4; 358/1.6; 358/1.9; 382/100; 382/112; 382/167; 382/254; 382/275

(58) Field of Classification Search
USPC ........ 358/504, 505, 1.15, 451, 1.9, 298, 3.26, 358/1.4, 1.6, 2.1, 3.02, 3.1, 515, 521, 526, 358/537; 382/112, 237, 165, 275, 100, 167, 382/193, 254, 260, 287, 295, 296, 307, 130, 382/141, 151, 162, 164, 189, 214, 218, 294, 382/309, 311, 318, 323; 347/240, 251, 129, 347/19, 238, 24, 43; 399/9, 15, 18, 19, 27, 399/28, 38, 41, 285, 46, 49, 11, 60, 182, 399/184, 298, 301, 310, 320, 321, 395, 400
See application file for complete search history.

(56) References Cited

U.S. PATENT DOCUMENTS

| | | | |
|---|---|---|---|
| 6,032,004 A | 2/2000 | Mirabella, Jr. et al. | |
| 6,665,425 B1 * | 12/2003 | Sampath et al. | ............... 382/112 |
| 6,755,498 B2 | 6/2004 | Revie et al. | |
| 6,760,127 B1 | 7/2004 | Shin et al. | |
| 6,775,031 B1 | 8/2004 | Fujiwara | |
| 7,125,094 B2 * | 10/2006 | Mizes | ............................. 347/19 |
| 7,701,614 B2 | 4/2010 | Yamazaki | |
| 2007/0188821 A1 | 8/2007 | Kojima | |
| 2008/0137914 A1 * | 6/2008 | Minhas | ......................... 382/112 |
| 2009/0148039 A1 * | 6/2009 | Chen et al. | .................... 382/165 |

* cited by examiner

*Primary Examiner* — Ngon Nguyen
(74) *Attorney, Agent, or Firm* — Gibb & Riley, LLC

(57) ABSTRACT

Methods and systems print a multi-color test pattern using a printing device to create a printed test pattern when the printing device is producing a printing defect. The methods and systems scan the printed test pattern to produce a scanned image and decompose the scanned image into color blocks using the computerized device. The methods and systems create intensity profiles of the color blocks using the computerized device and compare at least two of the intensity profiles of different colors to determine whether the intensity profiles indicate correlated printing defects using the computerized device. The methods and systems indicate, through the computerized device, whether a potential defect within a common printing element of the printing device or is located within one or more of the color printing elements of the printing device, depending upon whether the intensity profiles have correlated printing defects.

20 Claims, 5 Drawing Sheets

PROCESS DIRECTION STREAK SOURCE DIAGNOSIS IN PRINTERS

BACKGROUND

Embodiments herein generally relate to diagnosing printing defects, and more particularly determining whether a potential defect is located within a common printing element of the printing device (downstream) or is located within one of the color printing elements of the printing device (upstream) depending upon whether color intensity profiles obtained from a test sheet have correlated printing defects.

In attempting to drive down service costs for printing fleets, remote diagnostic tools are becoming more popular. Certain image quality failure modes have been identified as opportunities for implementing automated or semi-automated remote diagnostic tools, increasing the likelihood that the customer or the machine itself can aid in the problem diagnosis, thus avoiding the high cost of in-person service calls by field service engineers.

SUMMARY

An exemplary method herein prints a multi-color test pattern on a sheet of media using a printing device to create a printed test pattern (when, for example, the printing device produces a printing defect). The method scans the printed test pattern using a scanner to produce a scanned image. Next, the method corrects alignment of the scanned image to remove rotation, skew, and translation from the scanned image to produce a corrected scanned image using a computerized device. The method then decomposes the corrected scanned image into color blocks using the computerized device.

Additionally, the method creates intensity profiles of the color blocks using the computerized device. The method can align and/or enhance the intensity profiles, if desired. The method then compares at least two of the intensity profiles of different colors to determine whether the intensity profiles indicate correlated printing defects using the computerized device. In one example, the method can compare only two of the intensity profiles at a time.

If the intensity profiles have correlated printing defects, the method indicates (through the computerized device) that a potential defect is located within a common printing element (e.g., intermediate transfer belt (ITB), transfer to paper, fusing, etc.) of the printing device (downstream elements). Otherwise, if the intensity profiles do not have correlated printing defects, the method indicates (through the computerized device) that the potential defect is located within one or more of the color printing elements of the printing device (upstream elements). The method can also indicate whether a defective component (corresponding to the potential defect) comprises a customer replaceable unit or one that must be replaced by a service technician.

A printing device embodiment herein includes one or more processors, graphic user interfaces, marking engines, media supplies, scanners, etc. The marking engine prints a multi-color test pattern on a sheet of media to create a printed test pattern (when the printing device is producing a printing defect). The scanner scans the printed test pattern to produce a scanned image and the processor corrects alignment of the scanned image to remove rotation, skew, and translation from the scanned image to produce a corrected scanned image. The processor decomposes the corrected scanned image into color blocks.

The processor creates intensity profiles of the color blocks and can align and/or enhance the intensity profiles. Next, the processor compares at least two of the intensity profiles of different colors to determine whether the intensity profiles indicate correlated printing defects. Then, the graphic user interface can indicate that a potential defect is located within a common printing element of the marking engine if the intensity profiles have correlated printing defects. Alternatively, the graphic user interface can indicate that a potential defect is located within one or more of the color printing elements of the marking engine if the intensity profiles do not have correlated printing defects. The graphic user interface can also indicate whether a defective component (corresponding to the potential defect) comprises a customer replaceable unit or a service technician replaceable unit.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
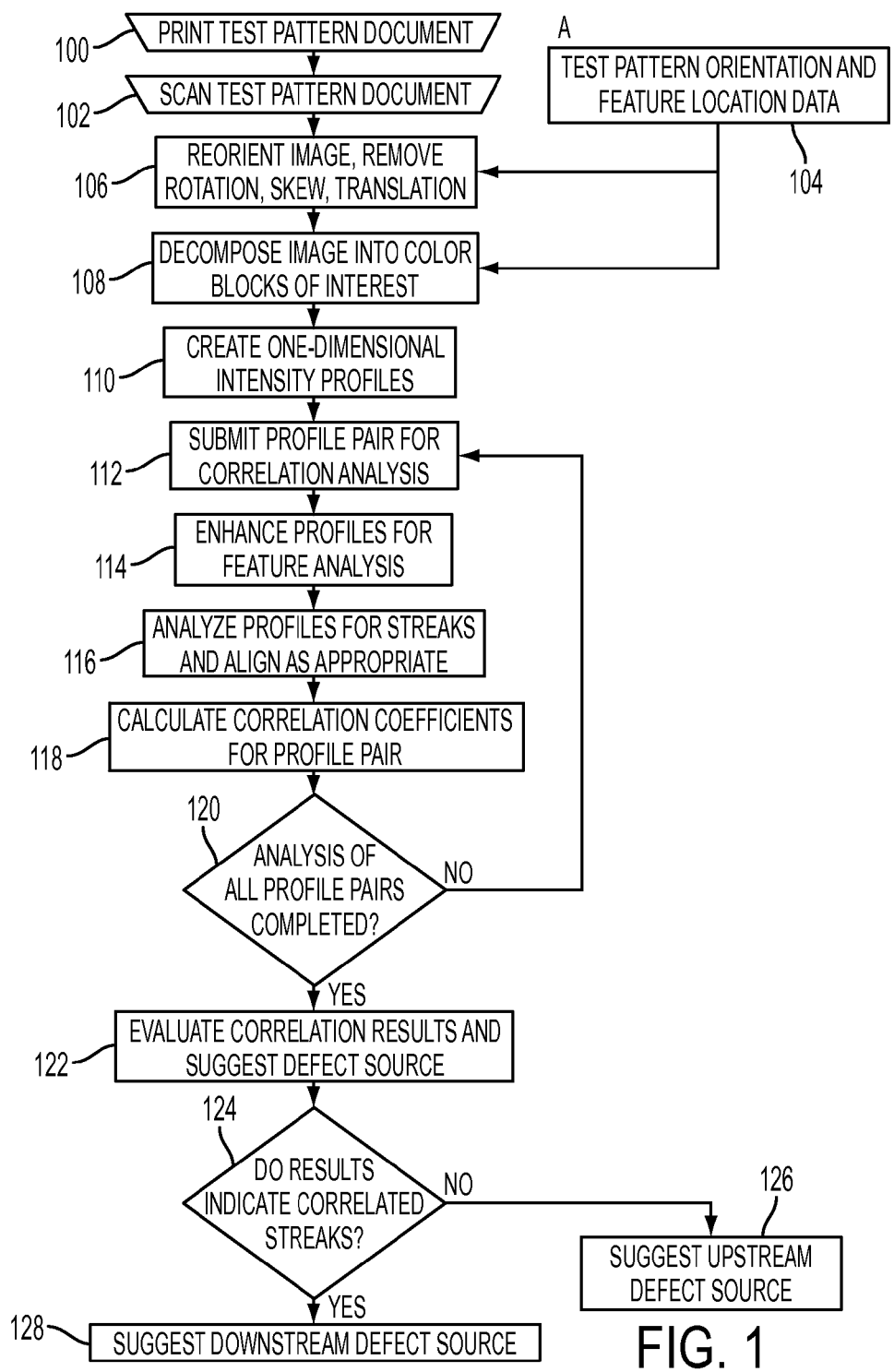
FIG. 1 is a flow diagram illustrating various method embodiments herein.

As mentioned above, increasing the likelihood that the customer or the machine itself can aid in the problem diagnosis can avoid the high cost of in-person service calls by field service engineers. One such image quality defect is a process direction streak (a defect streak that occurs along the printing media in the direction in which the media is moving). This type of defect can manifest itself in a variety of ways and can be caused by a variety of machine conditions and/or failed components. An automated method for "half-splitting" the set of possible failure sources between customer replaceable unit (CRU) and non-CRU components for this type of print quality defect is a desirable diagnostic tool, and could have a significant positive effect on service costs.

For color printers with multiple imaging or printing stations, this "half-splitting" idea involves attempting to narrow the source of the defect to components that affect the entire composite image or just a portion of the composite image. As described below, the embodiments herein can determine that a process direction streak that affects only a single color separation likely points to a failed component in a single CRU or print station (sometimes termed "upstream" in the printing process). Similarly, the embodiments herein can determine that a streak that affects the entire composite image, on the other hand, can indicate that the failed component or machine condition lies further along in the printing process downstream. There are of course exceptions to this rule, as certain contaminants have been known to propagate through the printing process and cause defects across multiple color separations, even though they originate from a single printing station. However, these are very extreme cases of CRU related failures that are not as likely to occur in the field (the customer usually requires service prior to the components reaching this drastic state of failure).

As described below, the embodiments herein utilize a simple, reliable automated tool for discerning multiple separation streaks from single separation streaks to provide a useful diagnostic decision point for the majority of printing defect cases.

In order to reach a decision regarding the presence and pervasiveness of process direction streaks across single or multiple color separations, thus implying a defect source component group, the following steps are taken. A specific test pattern is printed on the printer of interest. This test pattern has been designed to facilitate identification of process direction streaks over all color separations. The printed test pattern is then scanned and the resulting digital image file is submitted to the streak source diagnostic tool for processing and analysis. The image processing functions perform a number of steps, including image registration, removal of rotation, skew, and translation from the image. The image is then dissected into separate color blocks of interest and a one-dimensional intensity profile is created for each block. These one-dimensional profiles are processed further to enhance the signal to noise ratio and correct for cross-process non-uniformities. Finally, the profiles are passed into an alignment and correlation process, which makes an assessment of their relevance to each other with respect to the process direction streak information contained within. Numerical output from this process is used to suggest either an upstream (single separation) or downstream (multi-separation) failure mode source.

FIG. 1 is flowchart illustrating an exemplary method herein. In item 100, this exemplary method prints a multi-color test pattern on a sheet of media using a printing device that is exhibiting the streak defect to create a printed test pattern. An example of the test pattern printed is shown in FIG. 2 as item 200.

Figure 2:
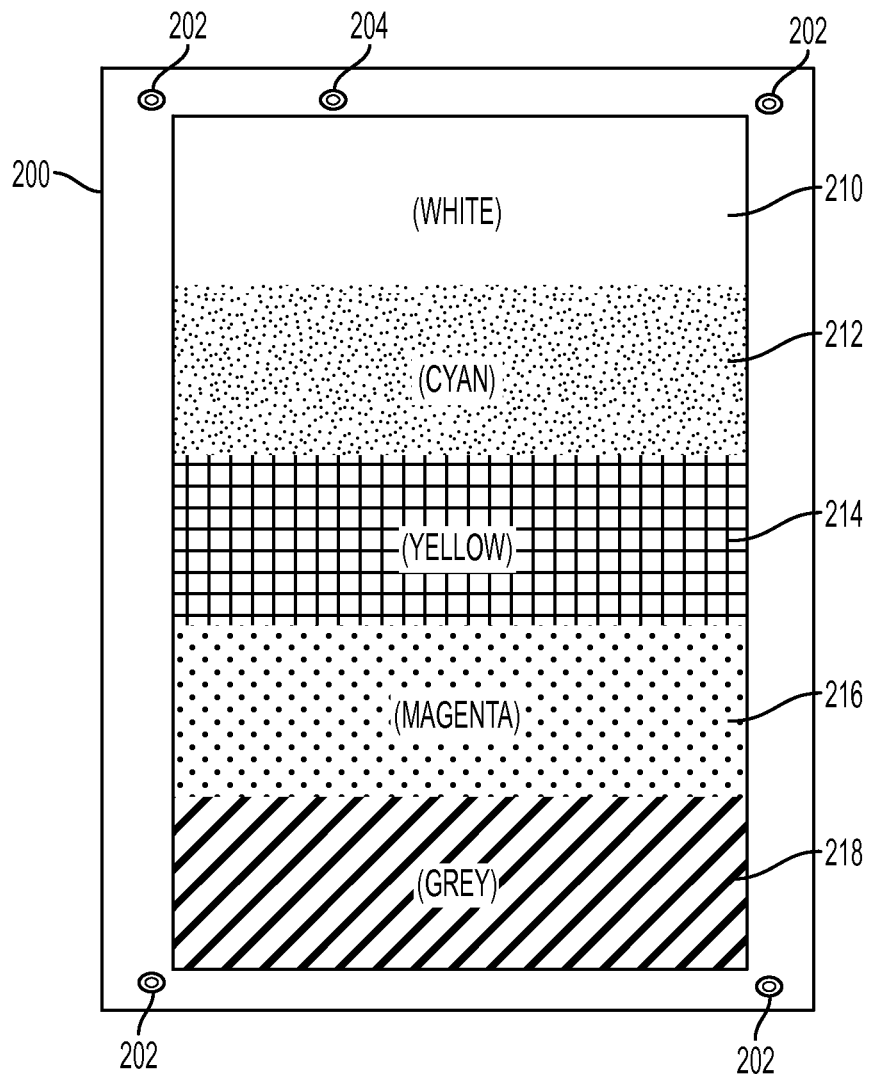
FIG. 2 is a schematic diagram of a sheet having test images printed thereon according to various method embodiments herein.

While FIG. 2 is shown in black-and-white, in FIG. 2, items 210-218 represent four halftone color blocks, one for each cyan 212, magenta 216, yellow 214, and black 218 (CMYK) color separation plus an area of blank paper 210 for reference areas of white. Each color block 210-218 traverses the entire width of the page in the non-process direction. In addition, each of the four corners contains a "bull's eye" fiducial mark 202. A fifth fiducial mark 204 is contained in the upper margin. These fiducial marks are used to correct for misalignment of the sheet during the scanning process.

Referring again to FIG. 1, the item 102, the method scans the printed test pattern using a scanner to produce a scanned image in an image file of suitable resolution. This can be done using a scanner available on the multifunction device if applicable, or using a separate piece of equipment.

Next, in item 106 the method corrects alignment of the scanned image and reorients the image to remove rotation, skew, and translation from the scanned image to produce a corrected scanned image (using a computerized device that can be part of or separate from the printing device). When reorienting the image in item 106, the method can use test pattern orientation and feature (202, 204) location data from item 104.

This step 106 contains a series of image manipulations to remove any rotation, skew and translation distortion introduced by the scanning process. The goal is to produce an image that is dimensionally identical to the original test target pattern, thus minimizing any x-direction component in the process direction streaks. The fiducial marks 202, 204 mentioned above are used for this purpose and therefore the image manipulation process can use prior knowledge of their desired size and locations. This is indicated by data block 104 in the flowchart. Finally, the image can then be trimmed slightly to remove edge distortions created by this process.

The method then decomposes the corrected scanned image into color blocks using the computerized device in item 108. At this point the image file is split into a series of two dimensional sub-images, one for each color separation to be analyzed. Again, the feature geographical information for the test target is used, in this case to define color block boundaries. For the purpose of this example, the discussion is limited to cyan, magenta and yellow color blocks; however, as would be understood by those ordinarily skilled in the art, any number of colors and any different colors can be used similarly with the embodiments herein.

The color block sub-images can be created in item 108 in a number of different ways, the simplest of which is to convert the color blocks to grey scale representations. Another embodiment herein performs item 108 by retaining the image file's red green blue (RGB) information, but uses only the complementary color channel for a given separation to increase the contrast between legitimate background color and the print defect. As would be understood by those ordinarily skilled in the art, many other similar processes can be used for item 108, and the embodiments herein are intended to include all such processes.

Figure 3:
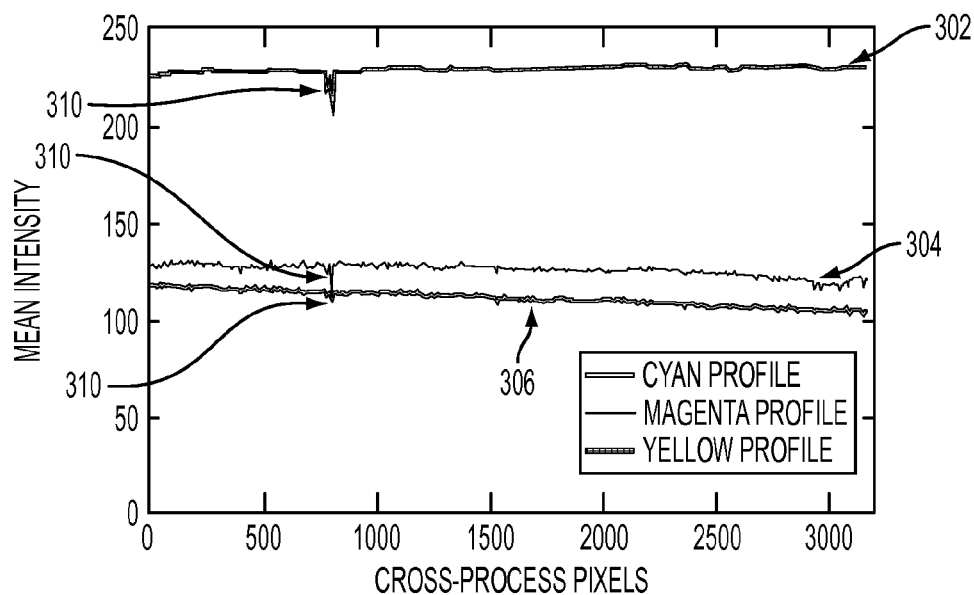
FIG. 3 is a correlation graph illustrating the operation of various method embodiments herein.

Additionally, the method creates intensity profiles of the color blocks using the computerized device in item 110. Each of the two dimensional sub-images from item 108 is reduced in item 110 to a one dimensional intensity profile 302-306 (in FIG. 3) by computing the mean of pixel intensities in the process direction. As shown in FIG. 3, the resulting signals (yellow 302, magenta 304, cyan 306) appear essentially flat for perfectly uniform color across the non-process direction, with significant features (i.e. streaks) appearing as aberrations 310.

In item 112, the profiles from item 110 are submitted for correlation analysis that occurs in a loop through in items 114-120. As correlation calculations operate on two vectors at a time, the one-dimensional profiles can be analyzed in pairs. For example, in a CMY analysis all combinations C-Y, Y-M, and M-C are analyzed individually.

In item 114, the method can enhance the intensity profiles, if desired. Depending on the signal strength, feature characteristics, and non-uniformities present in the one-dimensional profiles, a variety of signal processing techniques may be employed to prepare the one-dimensional profiles for analysis in item 114. These include scaling (where a simple scalar multiplication is used to normalize profile signal levels relative to each other before comparison); digital filtering (for attenuation of mid-band noise due to the effects of halftone screening or other print process phenomena); smile removal (removal of lower spatial frequency cross-process non-uniformities through the use of a fitted second order polynomial); etc.

In item 116, the method can align the intensity profiles, if desired. In item 116, a cross-correlation estimation sequence is calculated for the pair of profiles (or optionally using difference vectors derived from the pair of profiles) in order to determine if a slight spatial offset between strong features present in the profiles exists. If this is the case, and the offset is within a reasonable spatial limit, the two profiles are realigned to maximize correlation. This is useful as the removal of the rotation, scale, and translation artifacts above can cause some slight shifts in orientation in the final streak profiles.

Thus, in item 118, the method compares at least two of the intensity profiles of different colors and a final correlation coefficient is calculated for the current pair of profiles. This correlation coefficient is stored for evaluation after all pair combinations have been processed. The correlation coefficient is used to determine whether the intensity profiles indicate correlated printing defects (the same defect occurring at the same location for different colors).

In item 120, processing returns to item 112 until all profile pairs have been analyzed, at which point the method moves to item 120 to evaluate the correlation results and suggest defect sources.

If the intensity profiles have, for example, correlation coefficients above a predetermined standard (indicating correlated printing defects between colors) item 124 will indicate correlated streaks. In this case, processing proceeds to item 128, where the method indicates (through the computerized device) that a potential defect is located within a common printing element of the printing device (downstream elements).

Otherwise, in item 126, if the intensity profiles have, for example, correlation coefficients below a predetermined standard (indicating no correlated printing defects between colors), the method indicates (through the computerized device) that the potential defect is located within one or more of the color printing elements of the printing device (upstream elements). The method can also indicate whether a defective component (corresponding to the potential defect) comprises a customer replaceable unit or one that must be replaced by a service technician.

Thus, the correlation analysis determines whether the streaks are in fact observed in all of the color separations or not. As outlined above, this information is useful for determining whether the defect is likely upstream (in one of the color stations) or downstream (intermediate transfer belt (ITB) defects, transfer to paper or fusing).

There are a number of possible embodiments for the analysis of the correlation results in item 124. A brief description of several embodiments is given below. In one embodiment, a single correlation result between two color separations is selected and compared to a threshold. The goal here is to select the color pair whose correlation results will give the "most meaningful" information or the highest signal to noise ratio. Which result is chosen can be based on a priori knowledge of the system (colorants, media, scanner mode, etc) or offline experimental analysis during the design phase. This single correlation result can then be compared to a predetermined threshold. If the correlation between these two color separations is greater than the threshold, then it will be assumed that the streaks exist in all separations and are being caused by something "downstream" of the color stations. The key assumption here is that it is highly unlikely for a large correlation to exist between the streak profiles for two color separations when in fact the streaks are localized to those two colors only. For example, when using the grey channel streak profiles, the best results are obtained from the cyan to magenta correlations (the yellow color separation offers little information in the grey channel).

In another embodiment, in item 124, a statistical hypothesis test is performed using the correlation results for all of the color separations together in a single sample. The hypothesis test identifies whether there is a statistically significant difference between the sample mean and that of the baseline population. Here the baseline population contains correlation results for all color separations under conditions of streaks in one or two color separations only (not all three at once). In this analysis, this embodiment can ignore comparisons to the case where there are no streaks at all since it is assumed that the diagnostic procedure has been invoked for streaks and this embodiment is attempting to half-split the likely sources of the streaks (upstream or downstream).

This type of hypothesis testing technique is implemented using experimental or simulated streaks of data obtained at design time for documents with streaks in only one or two color separations. This baseline population of correlation results can be stored in the printer's memory and recalled during a subsequent diagnostic mode for testing of whether there was a statistically significant difference between a current set of correlation measurements and those of the baseline data set.

Figure 4:
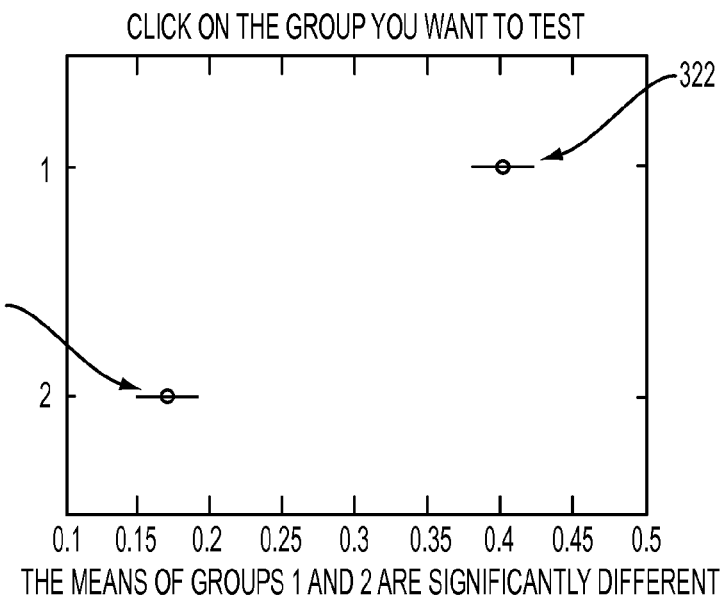
FIG. 4 is a correlation graph illustrating the operation of various method embodiments herein.

Based on the results of one of these types of correlation analyses, a conclusion is drawn as to whether the observed streaks were present in all three of the color separations or not. Once again, this information is useful in that it allows a half-splitting between upstream defect sources (the color stations) and downstream defect sources (intermediate transfer belt (ITB), transfer to paper, and fusing). Again, this half-split is useful in that it can greatly reduce the amount of time spent debugging a problem with a machine in the field. For example, in the chart shown in FIG. 4, item 320 illustrates two curves that are not correlated (indicating that the printing error is upstream), while item 322 illustrates two curves that are highly correlated (indicating that the printing error is downstream).

Figure 5:
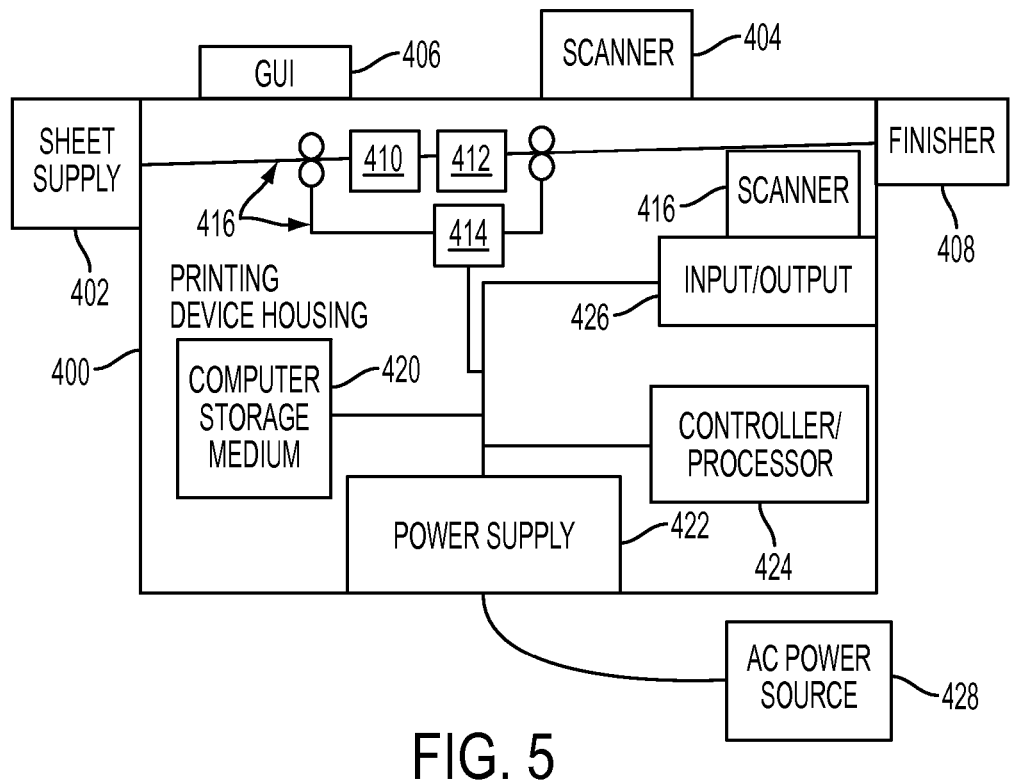
FIG. 5 is a side-view schematic diagram of a device according to embodiments herein.

FIG. 5 illustrates a computerized printing device 400, which can be used with embodiments herein and can comprise, for example, a printer, copier, multi-function machine, etc. The printing device 400 includes a controller/processor 424, at least one marking device (printing engines) 410, 412, 414 operatively connected to the processor 424, a media path 416 positioned to supply sheets of media from a sheet supply 402 to the marking device(s) 410, 412, 414, and a communications port (input/output) 426 operatively connected to the processor 424 and to a computerized network external to the printing device. After receiving various markings from the printing engine(s), the sheets of media can optionally pass to a finisher 408 which can fold, staple, sort, etc., the various printed sheets.

Also, the printing device 400 can include at least one accessory functional component (such as a scanner/document handler 404, sheet supply 402, finisher 408, etc.) and graphic user interface assembly 406 that also operate on the power supplied from the external power source 428 (through the power supply 422).

The input/output device 426 is used for communications to and from the multi-function printing device 400. The processor 424 controls the various actions of the printing device. A non-transitory computer storage medium device 420 (which can be optical, magnetic, capacitor based, etc.) is readable by the processor 424 and stores instructions that the processor 424 executes to allow the multi-function printing device to perform its various functions, such as those described herein.

Thus, a printer body housing 400 has one or more functional components that operate on power supplied from the alternating current (AC) 428 by the power supply 422. The power supply 422 connects to an external alternating current power source 428 and converts the external power into the type of power needed by the various components.

As would be understood by those ordinarily skilled in the art, the printing device 400 shown in FIG. 5 is only one example and the embodiments herein are equally applicable to other types of printing devices that may include fewer components or more components. For example, while a limited number of printing engines and paper paths are illustrated in FIG. 5, those ordinarily skilled in the art would understand that many more paper paths and additional printing engines could be included within any printing device used with embodiments herein.

In such a computerized (printing) device 400, the marking engine 410, 412, 414 prints a multi-color test pattern on a sheet of media to create a printed test pattern (if the printing device is producing a printing defect). Either scanner 404 or 416 can be used to (manually 404 or automatically 416) scan the printed test pattern to produce a scanned image and the processor 424 corrects alignment of the scanned image to remove rotation, skew, and translation from the scanned image to produce a corrected scanned image. The processor 424 decomposes the corrected scanned image into color blocks.

The processor 424 creates intensity profiles of the color blocks and can align and/or enhance the intensity profiles. Next, the processor 424 compares at least two of the intensity profiles of different colors to determine whether the intensity profiles indicate correlated printing defects. Then, the graphic user interface 406 can indicate that a potential defect is located within a common printing element of the marking engine if the intensity profiles have correlated printing defects. Alternatively, the graphic user interface can indicate that a potential defect is located within one or more of the color printing elements of the marking engine if the intensity profiles do not have correlated printing defects. The graphic user interface can also indicate whether a defective component (corresponding to the potential defect) comprises a customer replaceable unit or a service technician replaceable unit.

Figure 6:
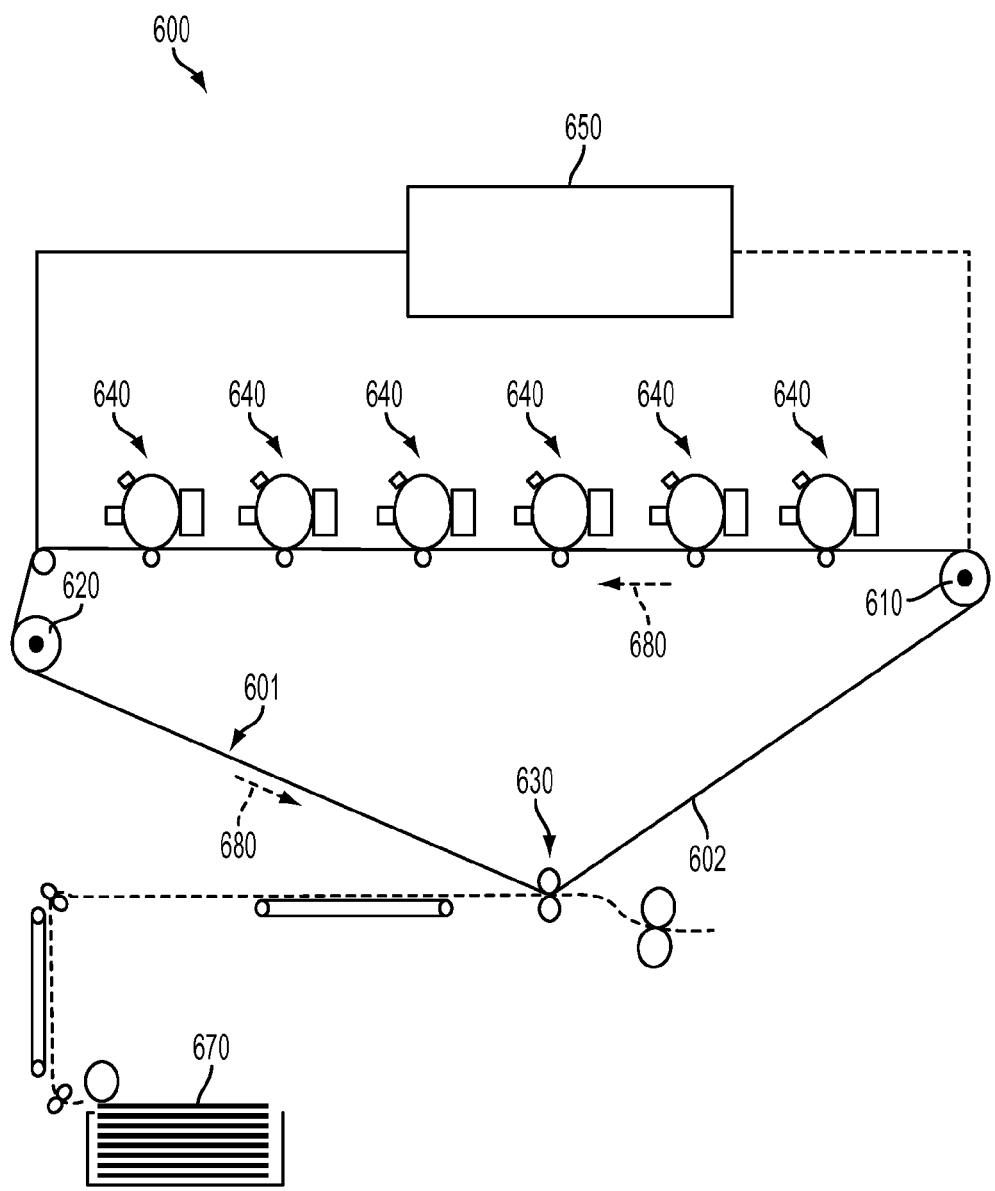
FIG. 6 is a side-view schematic diagram of a device according to embodiments herein.

FIG. 6 illustrates a more detailed aspect of a portion of a printing device. In FIG. 6, a printing apparatus 600 comprises an endless belt 601, such as an intermediate transfer belt (ITB) 601. The ITB 601 can be supported by the rollers 610, 620 and can further travel over the rollers 610, 620 in a given direction 680 (e.g., a counter clockwise direction, as illustrated, or alternatively a clockwise direction). Imaging stations 640 can be positioned in series on one side of the rollers 610, 620 adjacent to the outer belt surface 602. A belt-to-print medium (BTP) transfer station 630 can be positioned on the opposite side of the rollers 610, 620 adjacent to the outer belt surface 602. During operation of the printing apparatus, the ITB 601 can travel in the given direction 680 through the multiple imaging stations 640 in order to create a full-color image in an image area on the ITB 601 outer surface 602 under control of the processor 650. The full-color image can then be transferred from the ITB 601 to a print medium 670 (e.g., a sheet of paper) at the BTP transfer station 630.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
    printing a multi-color test pattern using a printing device having different printing elements, to create a multi-color printed test pattern, each of said printing elements printing a single color;
    scanning said multi-color printed test pattern to produce a scanned image;
    decomposing said scanned image into color blocks using a computerized device;
    creating intensity profiles of said color blocks using said computerized device;
    comparing at least two of said intensity profiles of different colors to determine whether said intensity profiles indicate a correlated printing defect across multiple color separations using said computerized device, said correlated printing defect appearing the same at the same location in at least two of said intensity profiles of said different colors; and
    indicating, through said computerized device, whether a potential defect is located within a common printing element of said printing device or is located within one of said different printing elements of said printing device, depending upon whether said intensity profiles have said correlated printing defect.

2. The method according to claim 1, further comprising aligning said intensity profiles using said computerized device before indicating where said potential defect is located.

3. The method according to claim 1, further comprising enhancing said intensity profiles using said computerized device before indicating where said potential defect is located.

4. The method according to claim 1, further comprising indicating whether a defective component corresponding to said potential defect comprises a customer replaceable unit or a service technician replaceable unit.

5. The method according to claim 1, further comprising comparing two of said intensity profiles at a time using said computerized device to determine whether said intensity profiles have correlated printing defects.

6. A method comprising:
   printing a multi-color test pattern using a printing device having different printing elements, to create a multi-color printed test pattern, each of said printing elements printing a single color;
   scanning said printed test pattern to produce a scanned image;
   correcting alignment of said scanned image to remove rotation, skew, and translation from said scanned image to produce a corrected scanned image using a computerized device;
   decomposing said corrected scanned image into color blocks using said computerized device;
   creating intensity profiles of said color blocks using said computerized device;
   comparing at least two of said intensity profiles of different colors to determine whether said intensity profiles indicate a correlated printing defect across multiple color separations using said computerized device, said correlated printing defect appearing the same at the same location in at least two of said intensity profiles of said different colors;
   if said intensity profiles have said correlated printing defect indicating, through said computerized device, that a potential defect is located within a common printing element of said printing device; and
   if said intensity profiles do not have said correlated printing defect indicating, through said computerized device, that said potential defect is located within one of said different printing elements of said printing device.

7. The method according to claim 6, further comprising aligning said intensity profiles before comparing said intensity profiles using said computerized device.

8. The method according to claim 6, further comprising enhancing said intensity profiles before comparing said intensity profiles using said computerized device.

9. The method according to claim 6, further comprising indicating whether a defective component corresponding to said potential defect comprises a customer replaceable unit or a service technician replaceable unit.

10. The method according to claim 6, said comparing of said intensity profiles comprising comparing only two of said intensity profiles at a time.

11. A printing device comprising:
   a processor;
   at least one graphic user interface operatively connected to said processor;
   at least one marking engine operatively connected to said processor, said marking engine having different printing elements, and each of said printing elements printing a single color;
   at least one media supply supplying sheets of media to said marking engine; and
   at least one scanner operatively connected to said processor,
   said marking engine printing a multi-color test pattern to create a multi-color printed test pattern,
   said scanner scanning said multi-color printed test pattern to produce a scanned image,
   said processor correcting alignment of said scanned image to remove rotation, skew, and translation from said scanned image to produce a corrected scanned image,
   said processor decomposing said corrected scanned image into color blocks,
   said processor creating intensity profiles of said color blocks,
   said processor comparing at least two of said intensity profiles of different colors to determine whether said intensity profiles indicate a correlated printing defect across multiple color separations, said correlated printing defect appearing the same at the same location in at least two of said intensity profiles of said different colors,
   said graphic user interface indicating that a potential defect is located within a common printing element of said marking engine if said intensity profiles have said correlated printing defect, and
   said graphic user interface indicating that a potential defect is located within one of said different printing elements of said marking engine if said intensity profiles do not have said correlated printing defect.

12. The printing device according to claim 11, said processor aligning said intensity profiles before comparing said intensity profiles.

13. The printing device according to claim 11, said processor enhancing said intensity profiles before comparing said intensity profiles.

14. The printing device according to claim 11, said graphic user interface indicating whether a defective component corresponding to said potential defect comprises a customer replaceable unit or a service technician replaceable unit.

15. The printing device according to claim 11, said comparing of said intensity profiles comprising comparing only two of said intensity profiles at a time.

16. A computer storage device comprising a non-volatile computer storage medium storing instructions executable by a computer, said instruction causing said computer to perform a method comprising:
   printing a multi-color test pattern using a printing device having different printing elements, to create a multi-color printed test pattern, each of said printing elements printing a single color;
   scanning said printed test pattern to produce a scanned image;
   decomposing said scanned image into color blocks using a computerized device;
   creating intensity profiles of said color blocks using said computerized device;
   comparing at least two of said intensity profiles of different colors to determine whether said intensity profiles indicate a correlated printing defect across multiple color separations using said computerized device, said correlated printing defect appearing the same at the same location in at least two of said intensity profiles of said different colors;
   indicating, through said computerized device, whether a potential defect is located within a common printing element of said printing device or is located within one of said different printing elements of said printing device, depending upon whether said intensity profiles have said correlated printing defect.

17. The computer storage device according to claim 16, further comprising aligning said intensity profiles using said computerized device before indicating where said potential defect is located.

18. The computer storage device according to claim 16, further comprising enhancing said intensity profiles using said computerized device before indicating where said potential defect is located.

19. The computer storage device according to claim 16, further comprising indicating whether a defective component corresponding to said potential defect comprises a customer replaceable unit or a service technician replaceable unit.

20. The computer storage device according to claim 16, further comprising comparing two of said intensity profiles at a time using said computerized device to determine whether said intensity profiles have correlated printing defects.

* * * * *